Dec. 30, 1952　　　　　K. A. KNUTSEN　　　　　2,623,592
CARD REPRODUCING MACHINE
Filed Oct. 8, 1948　　　　　　　　　　　　　14 Sheets-Sheet 1

INVENTOR.
Knut A. Knutsen
BY Louise O'Neil
attorney

Dec. 30, 1952 K. A. KNUTSEN 2,623,592
CARD REPRODUCING MACHINE
Filed Oct. 8, 1948 14 Sheets-Sheet 2
FIG. 2
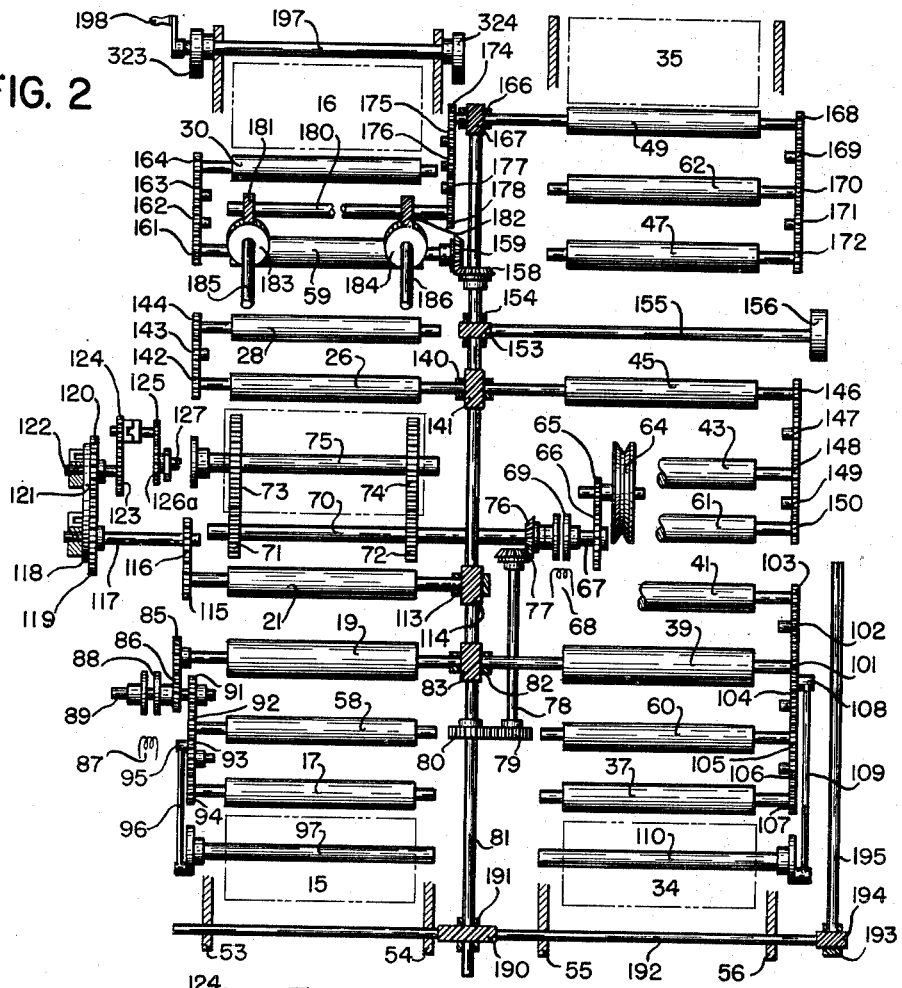
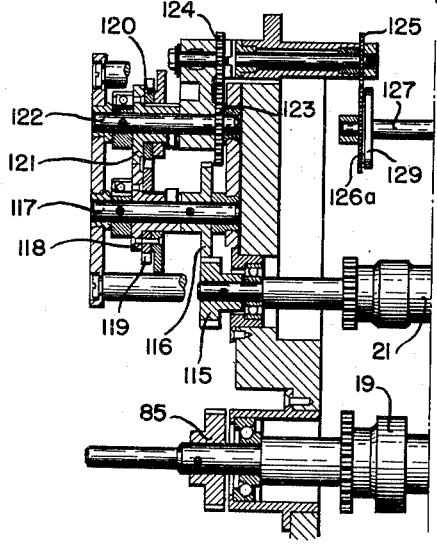
FIG. 6
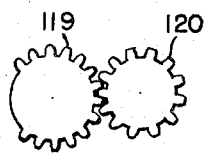
FIG. 6a
FIG. 6b
INVENTOR.
Knut A. Knutsen
BY Louise O'Neil
attorney INVENTOR.
Knut A. Knutsen

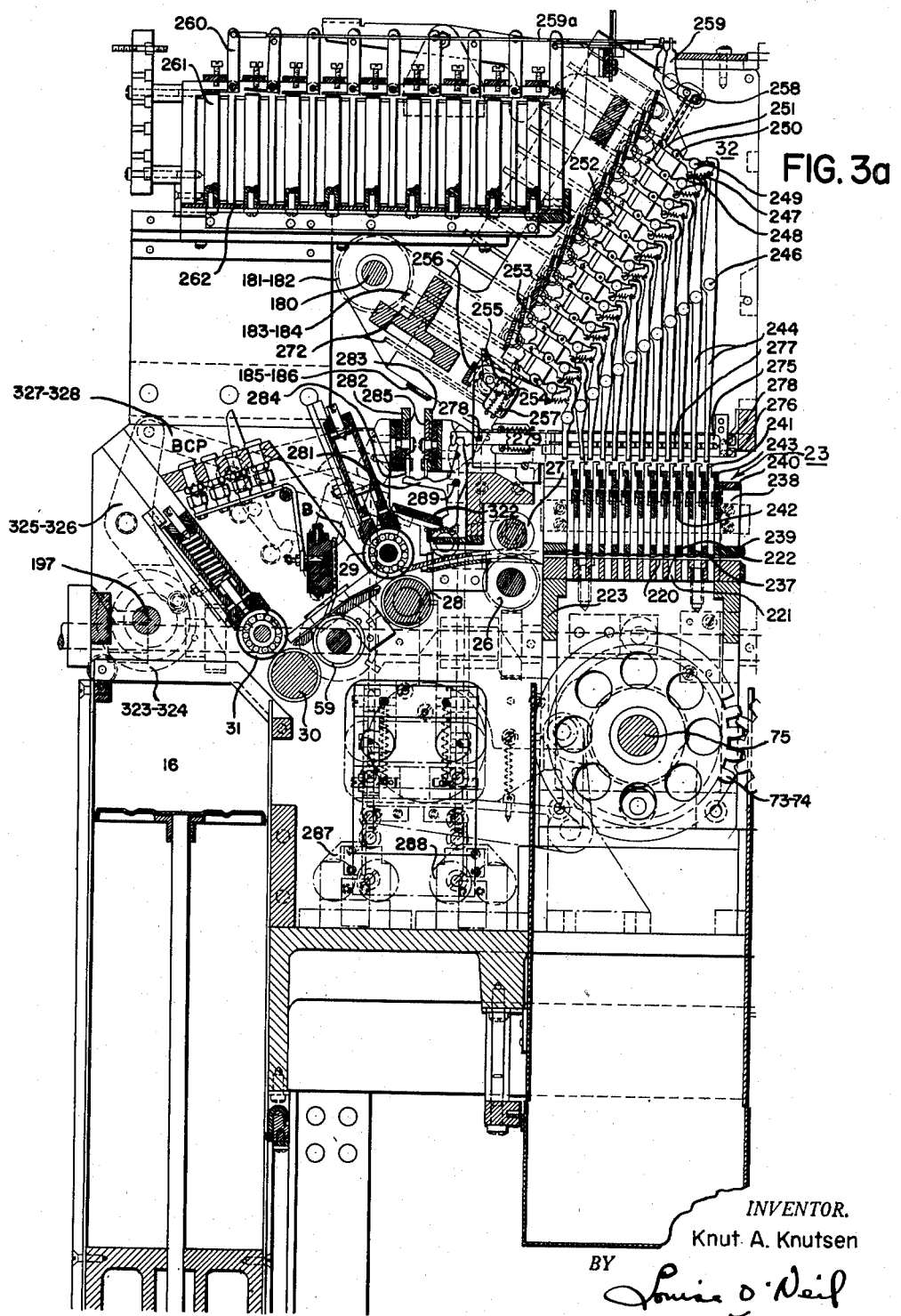

Dec. 30, 1952 K. A. KNUTSEN 2,623,592
CARD REPRODUCING MACHINE
Filed Oct. 8, 1948 14 Sheets-Sheet 6

INVENTOR.
Knut A. Knutsen
BY Louise O'Neil
attorney

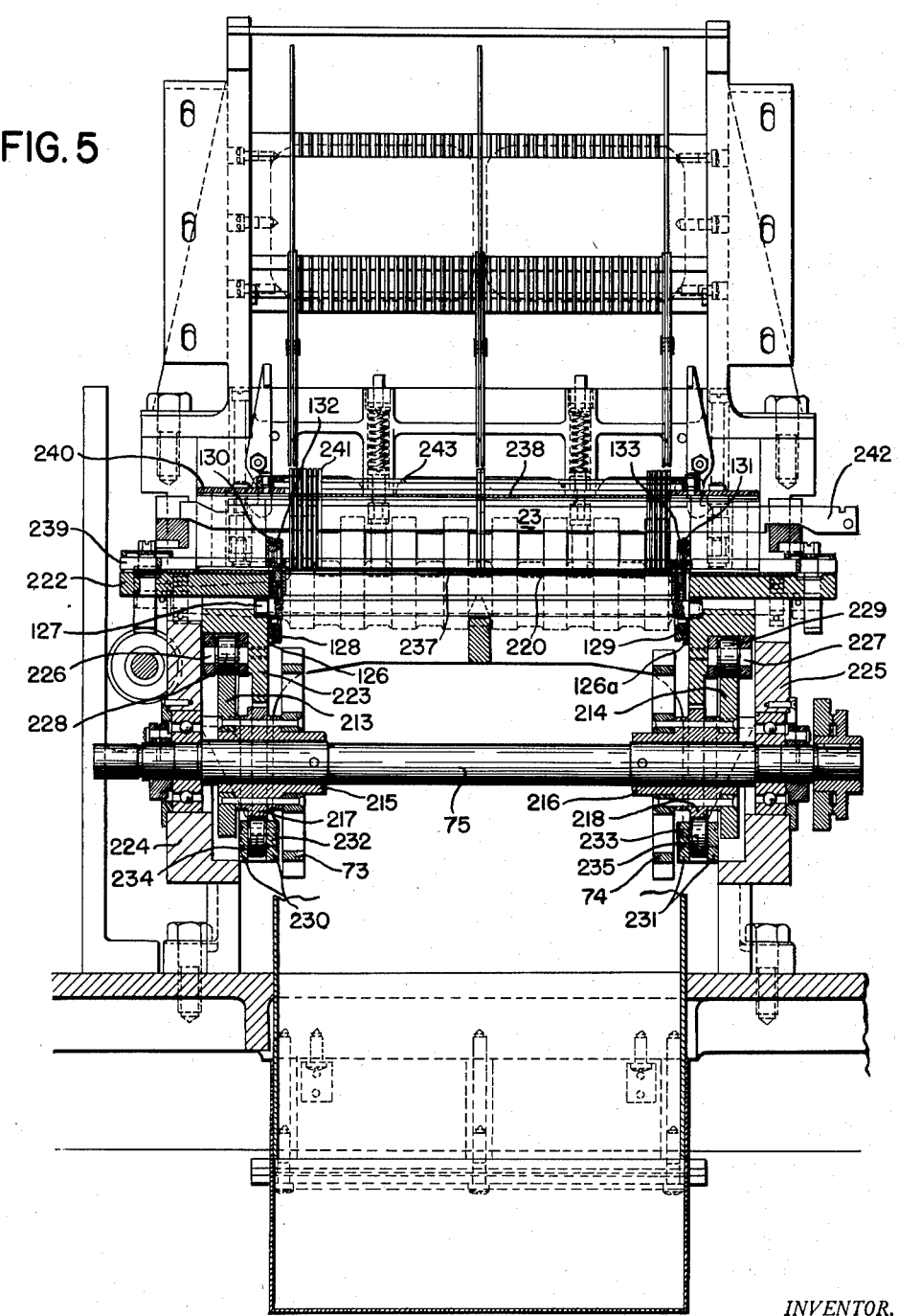

Dec. 30, 1952 K. A. KNUTSEN 2,623,592
CARD REPRODUCING MACHINE
Filed Oct. 8, 1948 14 Sheets-Sheet 8

INVENTOR.
Knut A. Knutsen
BY Louis O'Neil
Attorney

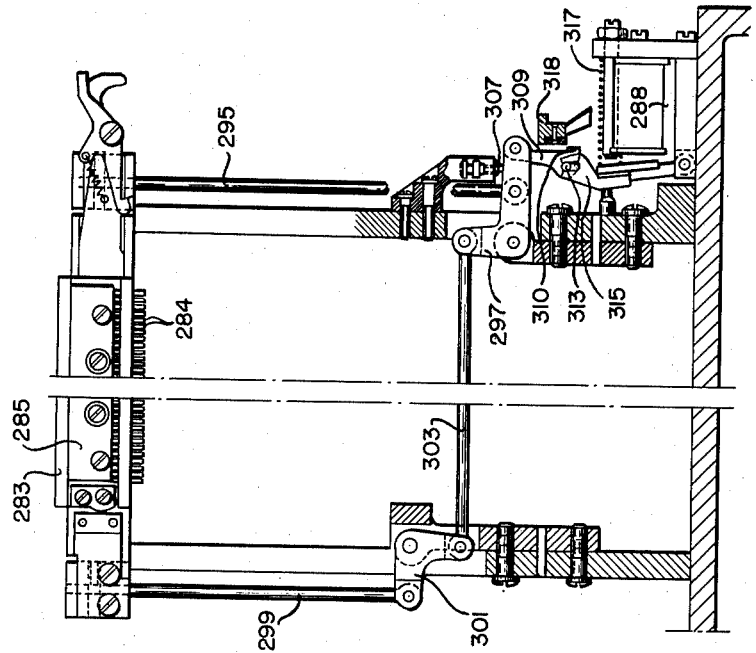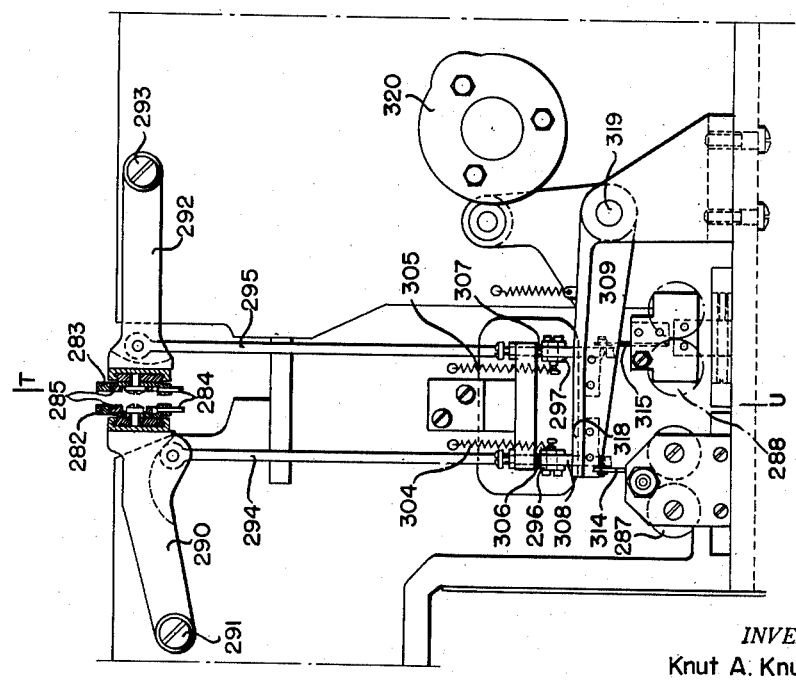

Dec. 30, 1952     K. A. KNUTSEN     2,623,592
CARD REPRODUCING MACHINE
Filed Oct. 8, 1948     14 Sheets-Sheet 10

INVENTOR:
KNUT ANDREAS KNUTSEN

By Louise O'Neil
ATTORNEY

Dec. 30, 1952  K. A. KNUTSEN  2,623,592
CARD REPRODUCING MACHINE
Filed Oct. 8, 1948  14 Sheets-Sheet 12

INVENTOR:
KNUT ANDREAS KNUTSEN
BY Louise O'Neil
ATTORNEY

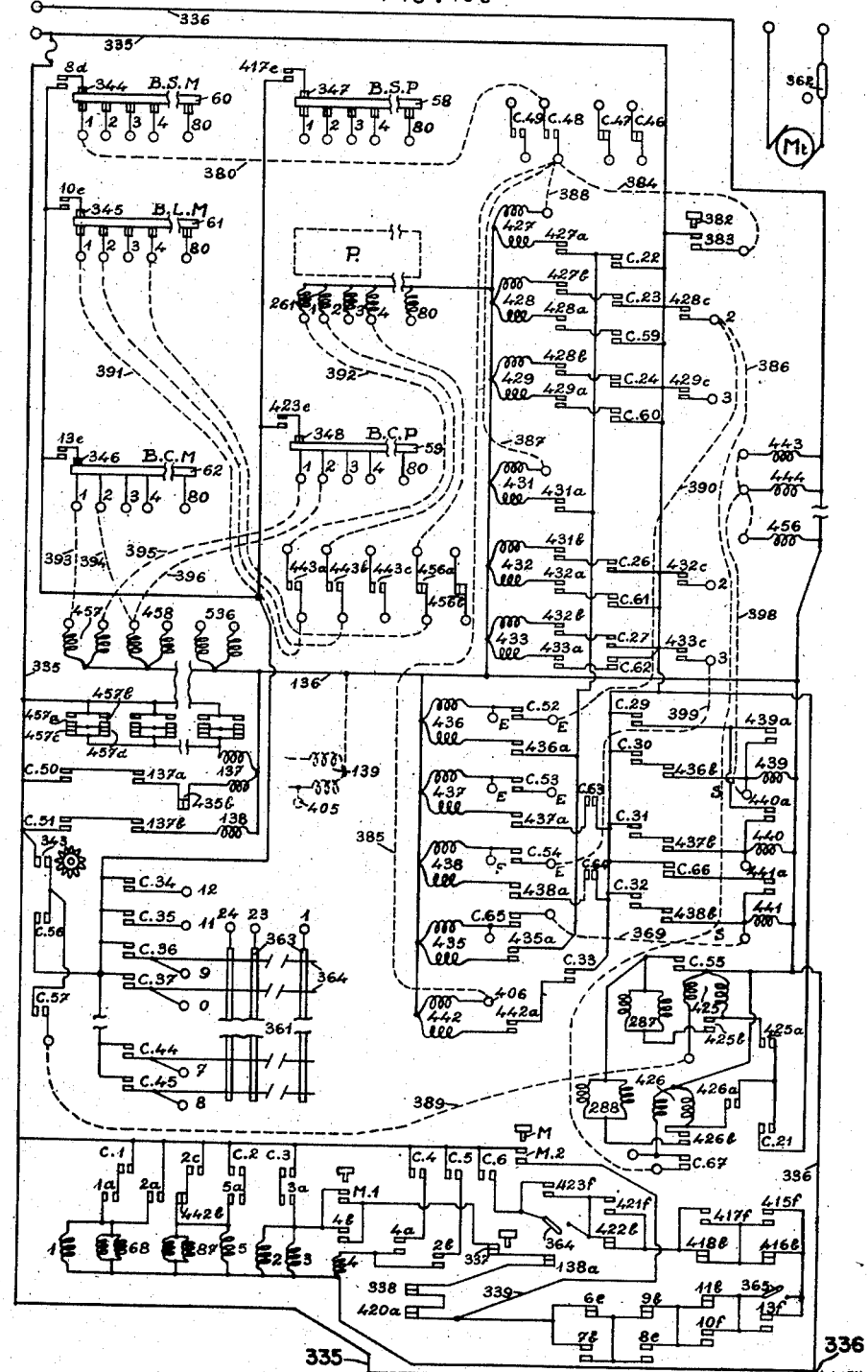

Patented Dec. 30, 1952

2,623,592

UNITED STATES PATENT OFFICE 2,623,592

CARD REPRODUCING MACHINE

Knut Andreas Knutsen, Paris, France; vested in the Attorney General of the United States Application October 8, 1948, Serial No. 53,503
In France May 13, 1941

6 Claims. (Cl. 164—115)

The invention relates to a punching machine for the transfer of perforations from one or a plurality of sequentially fed perforated record cards to one or a plurality of other sequentially fed record cards, under the control of the former cards.

One object of the invention is a punching machine provided with a data receiving device for the reception from a card of a plurality of items, for each column of the card to be perforated, and a punching device for the punching, in a single operation, of all items transferred to said data receiving device.

Another object of the invention is a punching machine provided with two card feeding devices, which together are provided with one or a plurality of analyzing devices for transferring items from one or more sequentially fed cards to the data receiving, or storing, device of the punching machine during the feeding of the cards, and for punching in a blank card perforations corresponding to the transferred items.

Further objects of the present invention will be seen from the following description which shows one particular form of embodiment of the invention, and some of the different ways of utilization of the machine.

Fig. 2 is a schematic plan view of the driving mechanism of the machine.

Figs. 3 and 3a show a longitudinal section through the blank card feeding device for blank cards to be punched.

Fig. 5 is a transversal section through the punching device.

Fig. 6 is a plan section through the driving shafts of the feed rollers of the punching device.

Fig. 6a is an elevational view of the circular wheel with certain teeth removed.

Fig. 6b is a detailed showing of cams 118 and 121, displaying the notch engagement.

Fig. 10 is a view showing part of the resetting device of the data receiving device.

Fig. 11 is a transversal section taken on lines T, U of Fig. 10.

Figure 15:
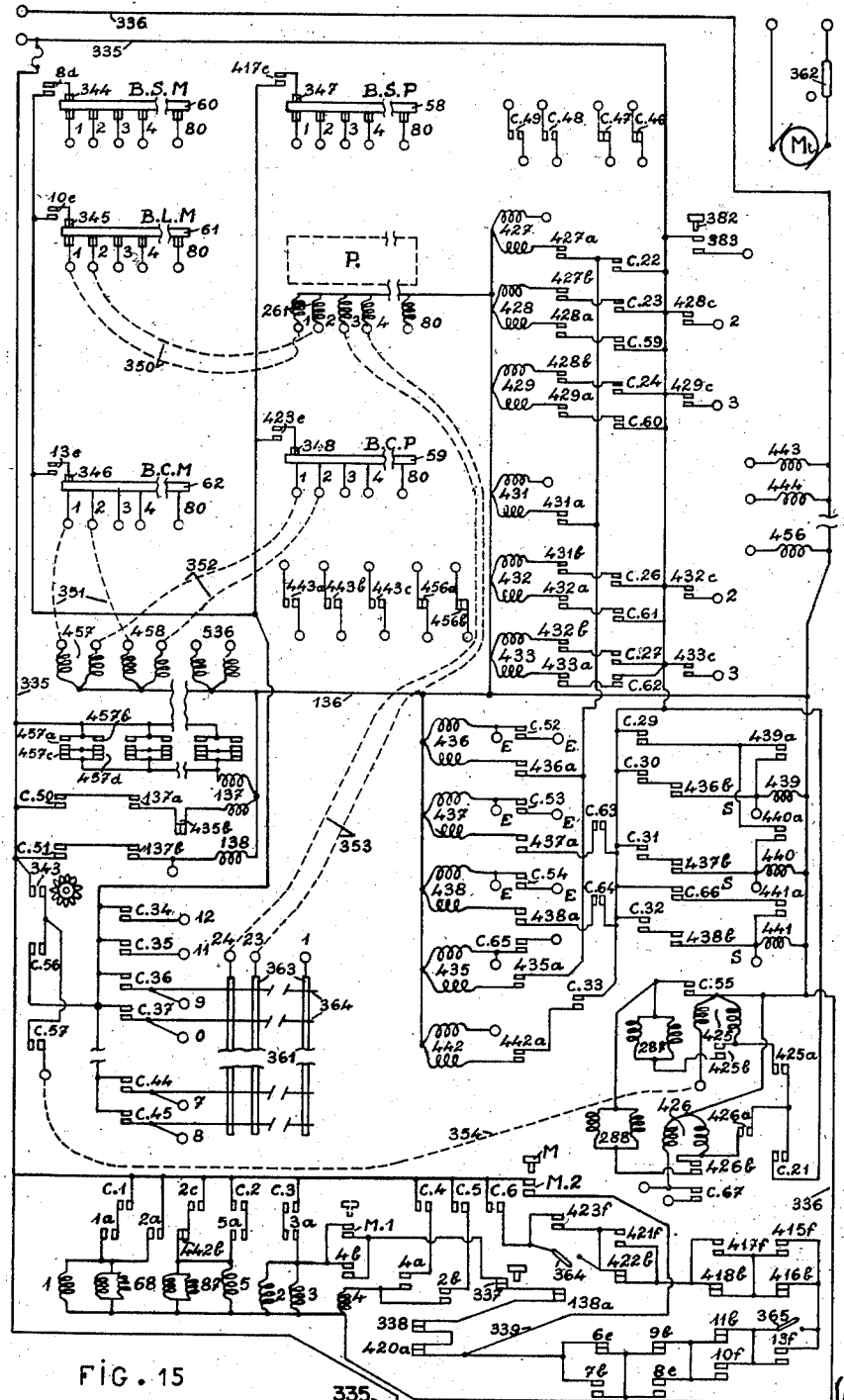
Figure 15A:
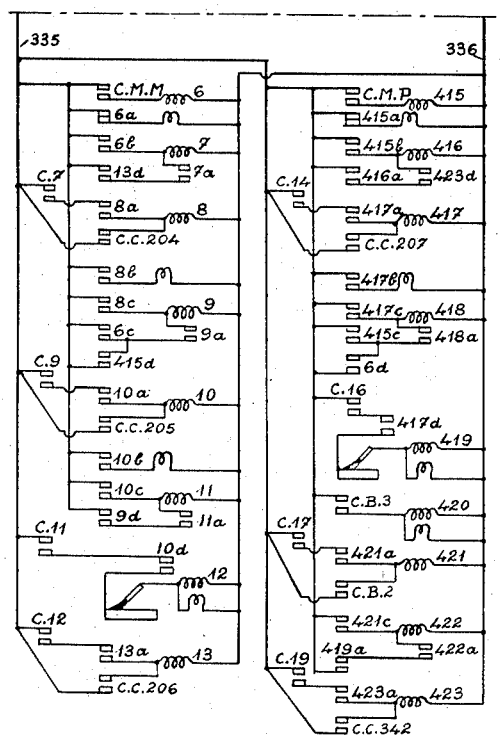

Figs. 15 and 15a taken together (and juxtaposed along the dash-dot lines at the top of Fig. 15a and at the bottom of Fig. 15) form a wiring diagram of the electric circuit connections of the machine.

Figure 15B:
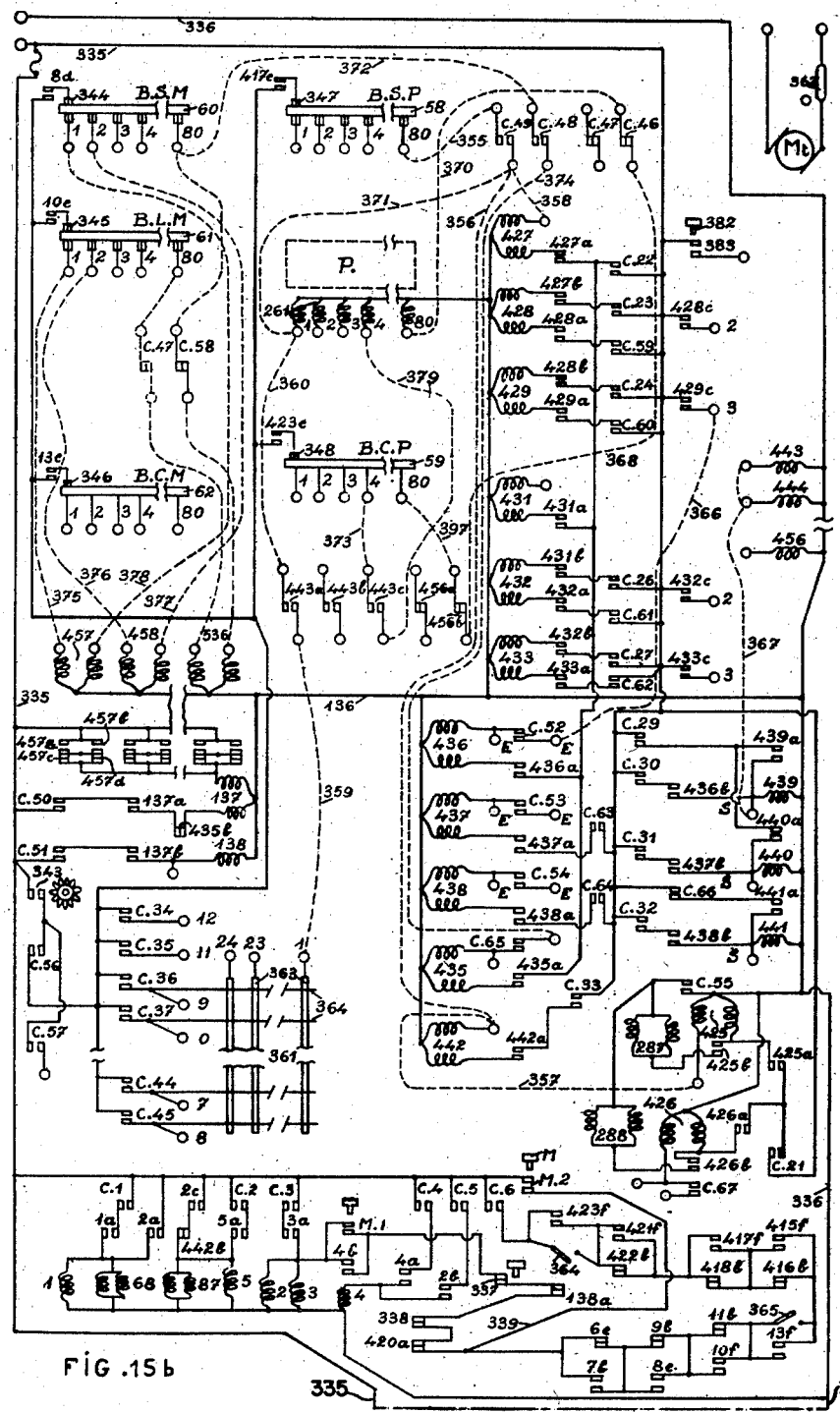

Figs. 15b and 15c show modifications of the plug connections of the wiring diagram Fig. 15 to punch cards in series by a master card and to punch a card under control of several cards respectively.

For the sake of ensuring comprehension of the drawings, some details have been omitted or only partially represented.

Figure 1:
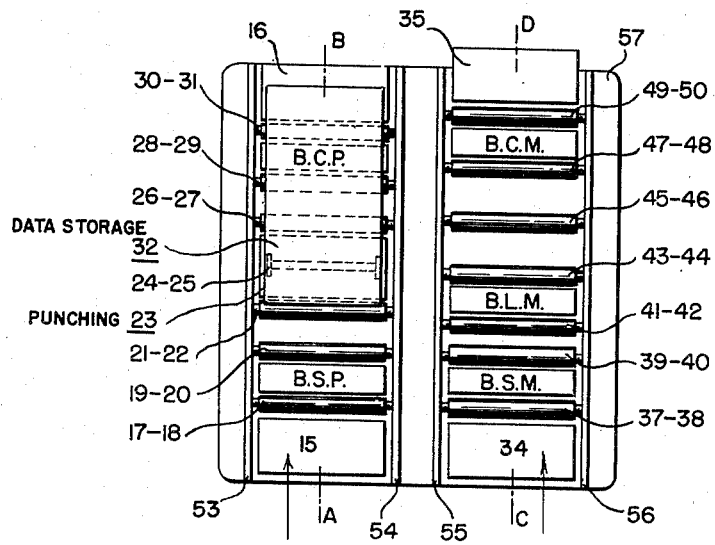
Fig. 1 is a schematic plan view.

Fig. 1 shows a schematic plan view of the machine with the two card feeding devices. The cards are analyzed during their movement by brushes which establish an electric circuit through each perforation of the card.

Figure 3:
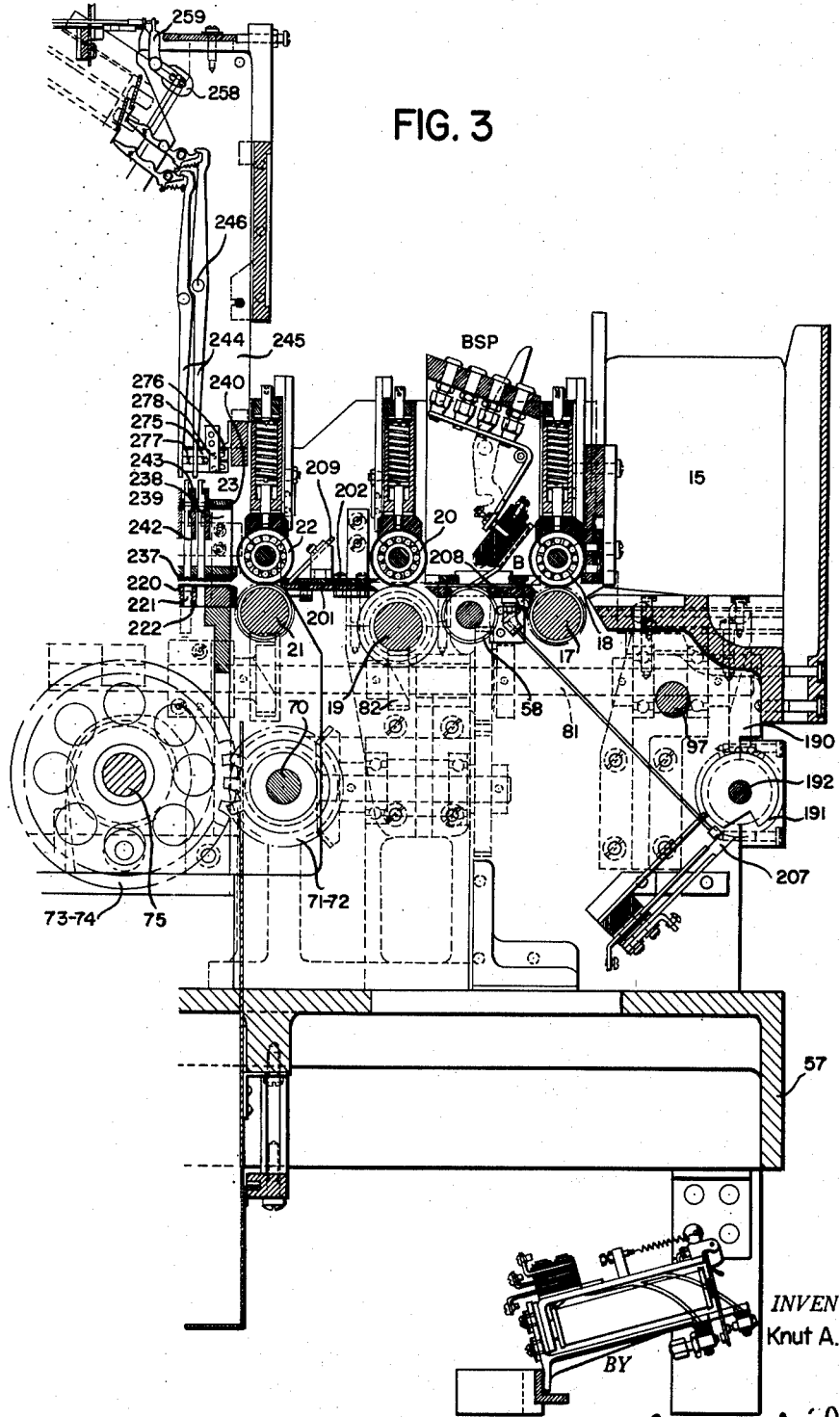

The card feeding device shown to the left in Fig. 1, a section of which is shown in Figs. 3 and 3a, will be hereinafter designated: "Blank card feeding device"; in said feeding device the cards are moved from hopper 15 to hopper 16 past the following parts: a pair of rollers 17—18, a row of analyzing brushes BSP, the pairs of rollers 19—20 and 21—22, punching device 23 with a pair of rollers 128—129 (see also Fig. 5), the pairs of rollers 26—27 and 28—29, a row of analyzing brushes BCP and a pair of rollers 30—31. Above the punching device is the data receiving device 32, in which the items to be punched are stored.

Figure 4:
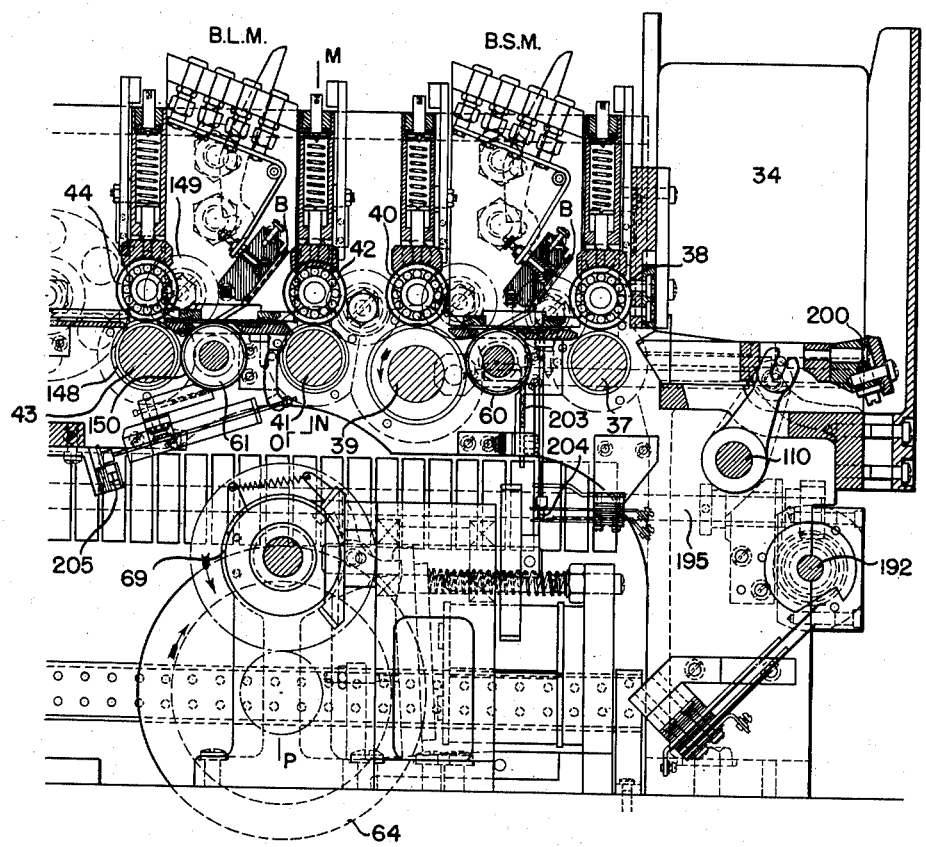
Figs. 4 and 4a show a longitudinal section through the preperforated pattern card feeding device.
Figure 4A:
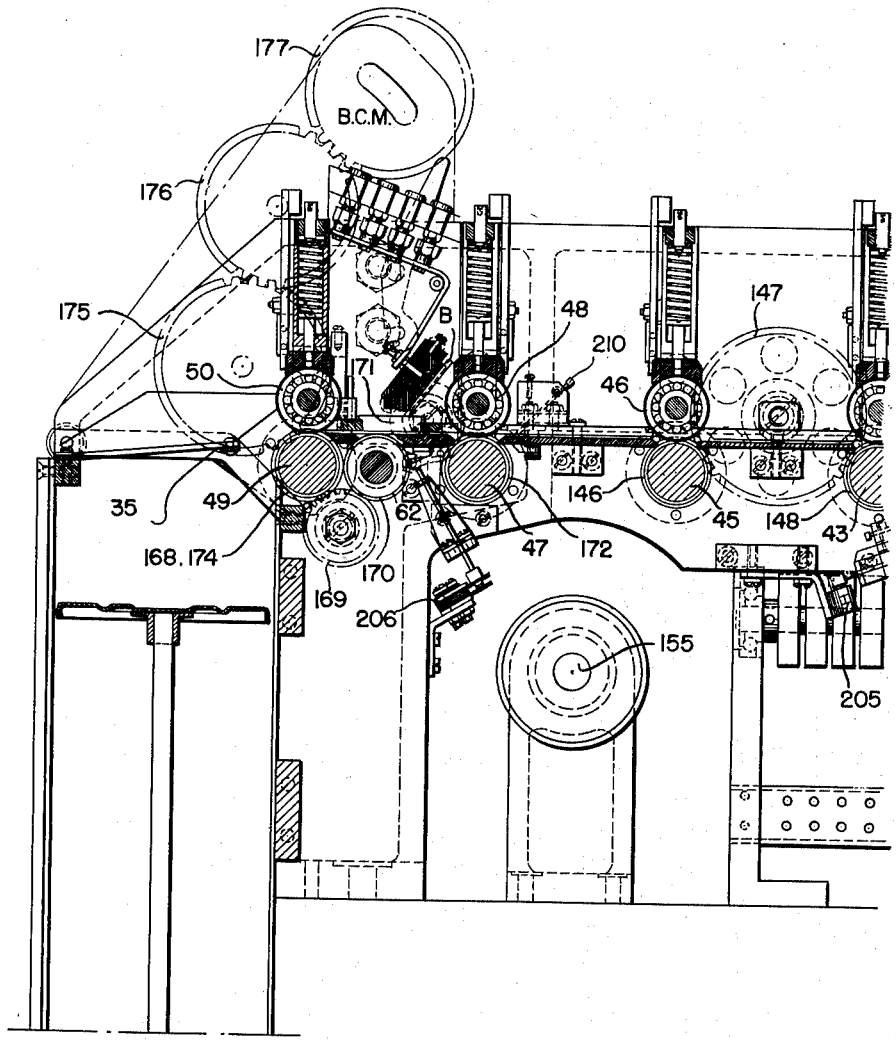

The card feeding device shown to the right in Fig. 1, a section of which is shown in Figs. 4 and 4a, will be hereinafter designated: "Pattern card feeding device"; in said feeding device the cards are moved from hopper 34 to hopper 35, past the following parts: a pair of rollers 37—38, a row of analyzing brushes BSM, the pairs of rollers 39—40 and 41—42, a row of analyzing brushes BLM, the pairs of rollers 43—44, 45—46 and 47—48, a row of analyzing brushes BCM and a pair of rollers 49—50. In the pattern card feeding device, cards are generally run through the machine without stopping. In the blank card feeding device, each card is stopped during the punching of the card.

Two cards leaving simultaneously the hoppers 15 and 34, pass simultaneously in front of the analyzing brushes BSP and BSM and under normal circumstances, simultaneously in front of the brushes BCP and BCM.

However, due to a disconnection of the two first rollers 17 and 18 from the driving shaft, under the control of magnet 81, Fig. 2, the blank card may be arrested before its passing the analyzing brushes BSP, while the pattern card continues to be moved forward. The two rows of analyzing brushes BCM and BLM are at such a distance one from the other that index point positions of the same value, for example the value nine, in two successive cards, are simultaneously analyzed by the corresponding rows of said analyzing brushes.

Different utilizations of the machine will be hereinafter described.

(1) *Duplication of cards.*—The cards which are to be duplicated are stacked in the pattern card hopper and analyzed one by one by the corresponding analyzing brushes. Owing to said analysis, the items corresponding to the perforations of the pattern cards will be entered into the data receiving device, whereupon the corresponding perforations will be perforated in the blank cards which are moved in the blank card feeding device. A card which has just been punched, will be compared with the corresponding pattern card by simultaneous analysis of said cards. In addition to items transferred by the analysis of each pattern card, the data receiving device may contain invariable items which have been entered either manually or from a counter and which items will be punched in each blank card.

(2) *Bunching of cards in series.*—In the blank card hopper are stacked pattern cards each followed by any desired number of blank cards. Each pattern card will cause the resetting to zero of the data receiving device, owing to the analysis of the pattern card by a row of brushes located before the punching device, and will thus be moved past the punching device without being punched. Owing to the analysis of the pattern card by another row of brushes located behind the punching device, the items corresponding to the perforations of the pattern card are entered into the data receiving device, and the following blank card is punched correspondingly during the subsequent punching operation. As the data receiving device may only be reset to zero by a pattern card, all the following blank cards will be punched in accordance with the first blank card after it has been punched according to its preceding pattern card.

(3) *Comparison of perforated cards in series.*—The cards which have been punched during the punching operation referred to in point 2 above may, without interrupting said punching in series, be stacked in the pattern card hopper, and moved by this feeding device in order to be compared, by simultaneous analysis of two consecutive cards, by two rows of analyzing brushes.

(4) *Punching of cards under simultaneous control of several other cards.*—In the pattern card hopper are stacked master cards, each followed by any desired number of pattern cards. Blank cards are stacked in the blank card hopper and moved simultaneously with the pattern cards. The items corresponding to the perforations of the master cards will be transferred, under the control of analyzing brushes, to determined columns of the data receiving device, while the first blank card is arrested. Then, the items corresponding to the perforations of the first pattern card, will be transferred, under the control of said analyzing brushes, to other columns of the data receiving device, and the first blank card will be simultaneously advanced. By the subsequent punching operation, the items from the first master card, and the items from the first pattern card will be punched in the first blank card. Then the data receiving device will be automatically reset to zero only for the columns containing items from the pattern card, whereas items from the master card and invariable items entered from the counter, remain in the data receiving device. By the analysis of a second pattern card during the next cycle of the machine, data will be transferred from this card to the data receiving device. By the subsequent punching operation, data from the second pattern card and from the master card (or the counter) will be punched in a second blank card and so on.

The first blank card thus punched, will be analyzed by the last row of analyzing brushes of the blank card feeding device, simultaneously with the analysis of the first pattern card by the last row of analyzing brushes of the pattern card feeding device, in order to compare the two cards.

Fig. 2 is a plan view showing the gear drive for the lower feed rollers of the two card feeding devices, together with the actuating mechanism for the two pickers, for the punching device, for the data receiving device, for the cam shafts, etc. Each feeding device comprises two sideplates 53—54 and 55—56 fixed to the table 57, Figs. 1 and 3, and supporting the lower feed rollers. To each lower roller, for example 21, Fig. 3, corresponds an upper roller, for example 22. Each upper roller is driven by the lower roller by means of toothed wheels.

Each row of brushes is composed of individual brushes which make contact through the perforations of the cards, with a contact roller 58, 59, Figs. 3 and 3a, and 60, 61, 62, Figs. 4 and 4a. Said brushes are insulated one from another and connected to a plug contact.

Figure 7:
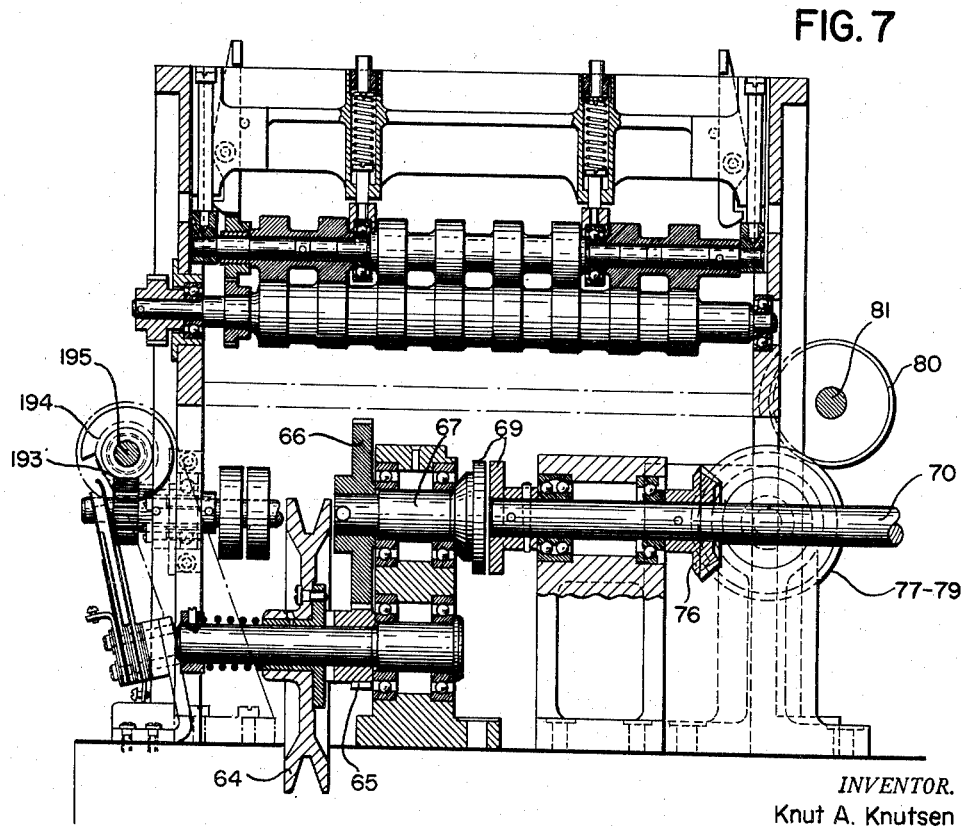
Fig. 7 is a transversal section of the mechanism on the pattern card feeding portion of the machine, the section being taken on lines M, N, O, P of Fig. 4.

The machine is driven by a motor, placed under the table, by means of a belt which drives a pulley 64, Figs. 2 and 7. The pulley drives through shaft 67 and wheels 65, 66, a shaft which, by a clutch 69 of conventional type controlled by a magnet 68, drives shaft 70. On the latter are fixed two toothed wheels 71, 72 each of which drives a wheel 73, 74 fixed on shaft 75, Figs. 2 and 3. Further, shaft 70 drives through bevelwheels 76, 77, shaft 78 which, through wheels 79 and 80 drives the longitudinal shaft 81 situated between the two card feeding devices. Shaft 81 drives through worm-wheels 82, 83, the lower roller 19 of the blank card feeding device. This roller has on the right, Fig. 2, an extension which constitutes the feed roller 39, Figs. 2 and 4, of the pattern card feeding device. Roller 19 drives, through gears 85, 86 and clutch 88 controlled by magnet 87, the shaft 89 which, through wheels 91, 92, drives the contact roller 58 which, through wheels 92, 93, 94, drives the feed roller 17. On wheel 93 is adjusted an eccentric pivot 95 which, through connecting rod 96, imparts a reciprocating motion to picker shaft 97. On roller 39 is fixed a toothed wheel 101 which, through gears 102, 103, drives the feed roller 41, Figs. 2 and 4, and through gears 104, 105, drives the contact roller 60. The feed roller 37 is driven by wheels 105, 106, 107. Wheel 101 is provided with an eccentric pivot 108 which, through connecting rod 109, imparts a reciprocating motion to picker shaft 110.

The longitudinal shaft 81 drives, through worm-wheels 113, 114 the feed roller 21 which, through wheels 115, 116 drives shaft 117. On the latter are fixed a cam 118 and a toothed wheel 119 provided with teeth only on a determined portion of its periphery. Wheel 119 meshes with wheel 120 fixed with a cam 121 on shaft 122. Shaft 122 drives through gears 123, 124, 125, 126a, the shaft 127 of feed rollers 128, 129. These rollers are not shown in Figs. 2 and 3 but are situated on a vertical line through shaft 75, and are shown in Fig. 5. On roller 128 is fixed a toothed wheel 126. Toothed wheels 126, 126a drive each an upper feed roller 132, 133, Fig. 5, through toothed wheels 130, 131. Said rollers move the card through the punching device and hold the card motionless on the die plate during the punching operation. Therefore, these rollers are driven intermittently; this is obtained by the suppression of certain teeth on wheel 119, Fig. 2. At the time when wheel 119 is not coacting with wheel 120, cam 118 engages (see Fig. 6b) a lug or tooth of cam 121 and stops the latter and thus the shaft 122 and the shaft 127 of the rollers. Shaft 117 makes one revolution for each cycle of the machine, and timing is so coordinated with the driving of the cards, that one cycle corresponds to eighteen time intervals between two index point positions of a column of the card. The time during which shaft 127 is at rest corresponds to three of said time intervals. Further, the longitudinal shaft 81 drives through worm-wheels 140, 141, feed roller 26, Figs. 2 and 3a, and feed roller 45, Figs. 2 and 4a. Roller 26 drives, through wheels 142, 143, 144, feed roller 28. Feed roller 45 drives feed roller 43, through gears 146, 147, 148, and contact roller 61 through gears 149, 150. Shaft 81 drives through wheels 153, 154, the shaft 155 which actuates an impulse emitter 156.

Figure 9:
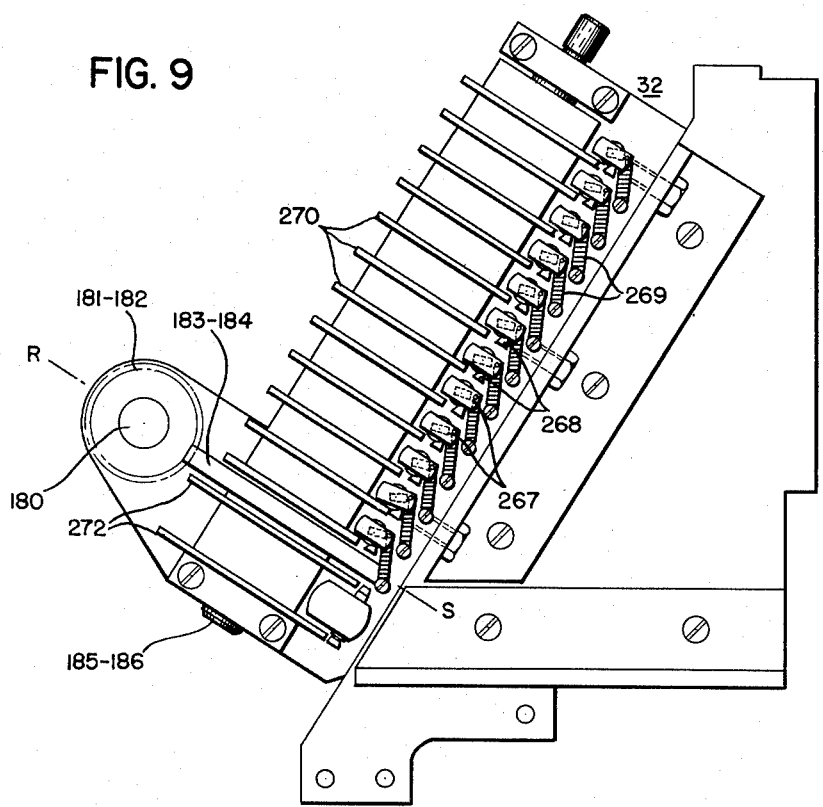
Fig. 9 is a side view showing part of the data receiving device.

Further, shaft 81 drives, through wheels 158, 159, the contact roller 59 which, through gears 161 to 164, drives the last feed roller 30 of the blank card feeding device. Shaft 81 drives, through gears 166, 167, the feed roller 49 which, through gears 168 to 170, drives the contact roller 62, and through gears 171, 172, the feed roller 47. Roller 49 drives further, through gears 174 to 178, the shaft 180, Figs. 2 and 3a, which, through wheels 181, 182 and 183, 184, drives the cam shafts 185, 186, which extend slantwise upwards, on the two sides of the data receiving device, Figs. 2, 3a and 9. Shaft 81 drives, through gears 190, 191, the cam shaft 192 which, through gears 193, 194, drives another cam shaft 195. When the motor is rotating and driving shaft 70 through clutch 69 is rendered effective by energization of magnet 68, all the shafts, feed rollers, cam shafts, etc., which have been referred to hereabove, will be driven, except the contact roller 48, the feed roller 17 and the picker shaft 97 which will be driven only when the clutch 88 is rendered effective by energization of magnet 87. Shaft 81 performs two revolutions, all the cam shafts one revolution, and the two picker shafts a reciprocating rotative movement for each cycle of the machine.

The feed rollers, except feed rollers 128, 129, Fig. 5, are rotated so as to advance the cards the same distance for each cycle of the machine. Feed rollers 128, 129 have an intermittent movement, in order to hold the blank card motionless in relation to the die plate during the punching operation. The movement of the cards is obvious from the graphs shown in Figs. 12, 13, 14. In those graphs, time is indicated in ordinates and is measured in cycles of the machine; the distances covered by the cards are read on the abscissa axis. The movements of the front and of the back of any card represented, for instance CVI, are thus figured by two parallel and generally slanting lines. In those figures are shown side by side the progressions of the cards in both feeds of the machine, that is respectively through the blank card feeding device on the left and through the pattern card feeding device on the right.

At the upper end of Fig. 2 is a shaft 197 which may be actuated by hand by a crank 198 for resetting to zero all the columns of the data receiving device.

The hoppers and pickers are the same for both card feeding devices. Their construction is well known and is illustrated in Fig. 4.

The upper feed rollers are all alike. They are maintained on each side by bushes which are guided in grooves of the upper side plates, and each upper feed roller is pressed against a lower roller by two springs. Between two pairs of rollers, the card is guided by guide plates, for example 201, 202, Fig. 3. The contact rollers are connected to the circuit by a brush, for example 203, Fig. 4. In the pattern card feeding device are placed three card contacts CC204, 205, 206; the blank card feeding device comprises two card contacts CC207, CC342 (the latter being shown only in Fig. 15a, but its embodiment being easily imagined by similarity with CC207 shown in both Figures 3 and 15a); these contacts are closed when a card actuates a lever, for example 208, Fig. 3. Two individual brushes 209, Fig. 3, and 210, Fig. 4a, are used to stop the machine when there are no cards under the brushes, owing to a deficient feeding of the cards.

The punching device and the data receiving device will be presently described. The shaft 75, Figs. 3 and 5, performs one revolution for each cycle of the machine. Each wheel 73, 74 is fixed with a cam 213, 214, on a sleeve 215, 216, said sleeve itself forming a cam 217, 218 and being fixed to the shaft. The die plate comprises a plate 220 provided with openings for the punches, said plate being riveted on a support plate 222 provided with slots 221. Each slot corresponds to a horizontal row of perforations of the card. The support plate is screwed to a frame plate 223 which may be actuated vertically in vertical guides of side plates 224, 225. On each side of the frame plate is secured an axle 226, 227 having a follower roller 228, 229 which rests on the upper portion of cam 213, 214. The frame plate has on each side a downward extension 230, 231 to which is secured an axle 232, 233, having a follower roller 234, 235, which is pressed against the lower portion of cam 217, 218. The cams are so shaped that, when shaft 75 is rotating, a short upward movement is imparted to the frame plate; then a short downward movement is imparted to the same, after which the frame plate remains motionless in its lower position during the remaining part of the revolution of the shaft.

Above the die plate is a lower punch guide which is secured to the frame plate, so as to leave an open space for the passage of the cards. Further, to the frame plate is fixed an upper punch guide. Said punch guides are composed of one or several perforated plates 237, 238 secured to a support plate 239, 240 provided with slots. The punches 241 have a notch in which is engaged a bar 242 which holds each punch in its normal position. The bars 242 are at each end fixed to the frame of the machine and are stationary. On the upper punch guide is secured a second series of bars 243 which participate in the movement of the die plate and serve to restore the punches to their normal position after the punching operation. By the upward movement of the die plate, the unperforated card will push the punches upwards. When a latch lever 244 is in its latching position, that is in a position in which its lower extremity overlies the upper extremity of a corresponding punch 241, the upward movement of the corresponding punch will be prevented and the card will be punched. By the downward movement of the die plate, the bar 242 causes the punch to be withdrawn from the card; this permits the card to be advanced again. Fig. 3a shows one row of punches for one column of the card. From left to right, the punches correspond to the index points from nine to zero, eleven and twelve. The punching device has eighty such rows of punches.

Above each punch is placed a latch lever 244. These latch levers are fixed on each side of a plate 245 which is common to two columns of the card, by axles 247 which traverse the plate. To each latch lever is attached a spring 247 which is fastened at its other end to a three arm lever 248 which is mounted on a pin 249 fixed to the plate. The right hand arm of lever 248 is urged against the upper end of the latch lever by said spring which holds this lever 248 in its normal position. The spring urges the latch lever against the right hand arm of lever 248 and thus the latch lever is held in its normal position. The left hand arm of lever 248 is connected by a pin 250 to a rocking lever 251 pivotally mounted on a rod 252; the left hand end of said rocking lever is just beneath the lower edge of the stop bar 253 when the latter is in its locking position.

Each rod 252 carries twelve rocking levers 251, and its lower end is provided with an opening in which a pin 254 is engaged. This pin is secured to a lever 255 which is pivotally mounted on plate 245. Lever 255 may be actuated by the resetting bar 256. To the rod 252 is attached a spring 257 which, at its other end, is fixed to the plate and draws the rod to its lower position of rest. At its upper portion, the rod is provided with an opening in which is engaged a pin 258 fixed to the lever 259 which is pivotally mounted on the plate. To lever 259 is connected a link 259a which, at its other end, is connected to the armature 260 of magnet 261. To each column of the card corresponds a magnet 261 which is secured to a plate 262.

The movement of stop bars 253 is governed by a double cam drive mechanism, one drive on each side of the data receiving device. The double drive mechanism serves to avoid torsional strain on the stop bars. The two drive mechanisms being alike, one only will be described.

Figure 8:
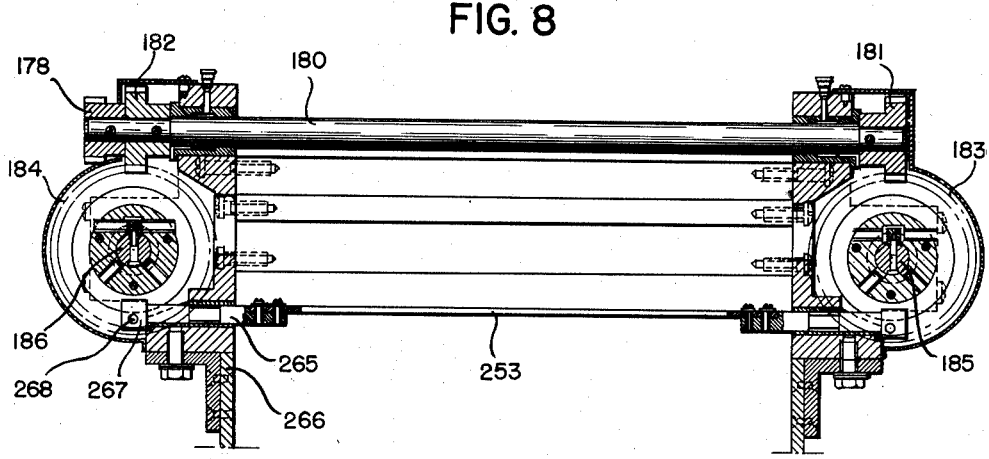
Fig. 8 is a transversal section taken on lines R, S of Fig. 9.

Each stop bar 253 is at each end riveted to an axle 265, Fig. 8 lodged in a support fixed to each side plate 266 of the data receiving device. At the end of each axle is riveted a sleeve 267, to which is fixed a stud 268 which projects from one side of the sleeve. Adjacent to each end of the stop bar and cooperating with said stud 268, is one of the twelve cams 270, Fig. 9, which are secured to the slanting shafts 185, 186 on each side of the data receiving device. Due to the rotation of these shafts, cams 270 strike one after another against a corresponding stud 268 and cause the stop bars to turn about their longitudinal axis, one after another, into locking position. A moment later, the spring 269 restores the stop bar to its initial position. There is a stop bar for each perforation to be made in a column of the card.

In Fig. 3a, from bottom to top, the stop bars correspond to the index points nine to zero, eleven and twelve. The cams are so adjusted that the stop bar corresponding to the nine index point is in locking position when the nine index point position is analyzed by one of the analyzing brushes BCP or BLM. The stop bar corresponding to the eight index point is in locking position when the eight index position is analyzed and so on. When any one stop bar is in locking position, all the other stop bars are in their initial position of rest. The cams 272, Figs. 9 and 3a, serve to move the bar 256 once for each index point position of a column of the card which is analyzed, so as to secure that rods 252 are in their initial lower position at the beginning of the analysis of each index point position.

The transfer of an item perforated in a card, to another card is effected as follows: It is assumed that a perforation eight of a column of the card is analyzed by one of the analyzing brushes BLM, and that the brush in question is connected to a magnet 261. The second lowermost stop bar is at this time in locking position, Fig. 3a; all the other bars are in inoperative position. The energization of magnet 261 will cause a leftward movement of the corresponding link 259a and subsequent upward movement of the rod 252 with the twelve rocking levers 251, as shown in Fig. 3a. Rocking levers 251 will rock about the pins 250. The second lowermost rocking lever corresponding to the eight index point will strike with its left hand end the corresponding stop bar which is in locking position; therefore the right hand arm of the rocking lever will be moved in opposition to the effect of spring 247, so that lever 248 may be rocked in a clockwise direction and that the corresponding latch lever 244 may be released. This latch lever will be moved into latching position by spring 247 as shown in Figs. 3 and 3a. When the perforation which is analyzed has passed the analyzing brushes, the energization of the magnet ceases and spring 257 draws rod 252 into its initial position of rest. If the analyzed card has in the same column a second perforation, for example a perforation seven, when this perforation is analyzed the third lowermost stop bar is in locking position, while the second lowermost stop bar has been restored to its initial position of rest. When the magnet is energized again, the rod 252 is moved upwards again and the third lowermost rocking lever will hit the stop bar which is in locking position, and thus, the latch lever for the seven index point will be drawn into latching position by the corresponding spring 247. When a card has for example twelve perforations in the column which is analyzed, the twelve latch levers 244 will be moved into latching position. A latch lever moved into latching position remains in this position until the card has been completely analyzed and the subsequent punching operation is finished. The latch levers for variable items will then be restored to their initial position by means of a special device which will be presently described.

On each plate 245 are movably secured two rods 275, 276, Fig. 3a. Each rod is provided with twelve noses 277 projecting laterally, so that each nose may engage a corresponding latch lever. Each rod is provided at each end with an elongated opening in which a stationary guide pin 278 is engaged. To each rod is attached a spring 279 which, at the other end, is fixed to the plate 245 and which draws the rod to the right into its position of rest. In a notch 280 of each rod is engaged the upper arm of a three arm lever 281 which may rock about a stationary pivot 289. Above the left hand arms of all levers 281, extend two bars 282, 283. Each bar is provided with 80 openings in each of which a pin 284 may be inserted and held by a strip 285. To each lever 281 correspond for each bar, one opening and one pin. When a bar is moved downwards, each pin will strike against the corresponding lever 281, which will move the corresponding rod 275, 276 leftwards and effect the resetting to zero, that is the resetting into their initial position of all latch levers of one column of the data receiving device. When for a bar, selected pins have been previously removed, the resetting to zero of the columns of the data receiving device which correspond to the removed pins, will not be effected. The movement of bar 282 is automatically controlled, from the perforated card, by a magnet 287 (see Fig. 10), and the movement of bar 283 by another magnet 288. Therefore, after a punching operation, the latch levers corresponding to any column of the card may be reset to zero, under the control of the analyzed card itself.

The bar 282 is at each end secured to a lever 290 which may rock about a stationary pivot 291 Fig. 10. The bar 283 is at each end secured to a lever 292 which may rock about a stationary pivot 293. One of the levers 292 is connected, by a link 295, to lever 297. The other lever 292 is connected by a link 299, lever 301 and link 303, to the same lever 297 which may rock about a stationary pivot, Figs. 10 and 11. The two levers 290 are connected in the same manner to lever 296; only the link 294 corresponding to link 295 is shown. A spring 304, 305 tends to rock each lever 296, 297, so that the right hand arms, Fig. 11, of these levers rest against an adjustable stop screw 306, 407. To each lever 296, 297 is pivotally connected a lever 308, 309, which is provided at its lower end with a nose 310. Lever 308, 309 is further provided with a stud 313 which engages the forked extension 314, 315 of the armature of magnet 287, 288. Normally spring 317 holds the armature in the position in which nose 310 is not beneath lever 318. If the magnet is energized, the armature will rock lever 308, 309, so that its nose comes under lever 318 in order that, if the latter is moved downwards, lever 296, 297 may be rocked clockwise, and bar 282, 283 moved downwards all the while keeping its horizontal position. Lever 318 may rock about a stationary pivot 319 and is rocked counterclockwise by cam 320 after each punching operation, Fig. 10. A third resetting bar 322, Fig. 3a, when moved to the right, rocks the lower arms of levers 281 and restores thus all the latch levers without exception to their initial position. Bar 322 is moved by hand by rotating a shaft 197 provided with a crank. On this shaft and on each side of the machine is secured a cam 323, 324, each of which cooperates with a lever 325, 326; each lever is connected, by means of a link 327, 328, to an end of bar 322.

The operation of the machine will be presently described with reference to the circuit diagram, Fig. 15. In the diagrams, all cam contacts are designated by the letter "C" followed by the numeral of the contact. All relay contacts are designated by the numeral of the magnet by which they are controlled, followed by a letter. Relay contacts are shown in the position which they occupy when the corresponding magnet is not energized.

(1) *Duplication of cards.*—The plug connections are shown in Fig. 15 by dotted lines. Only two columns of the card are plugged. Brushes for columns one and two of the row of brushes BLM are each connected to a magnet 261 of the data receiving device by plug connections 350. For column one, one of the brushes BCM is connected by a plug connection 351 to a coil of a control relay 457, whereas for the same column one of the brushes BCP is connected, by a plug connection 352, to the other coil of the same control relay 457. For column two, a second control relay 458 is plugged likewise. For the entry of invariable items, two elements of a counter 361 are each connected to a magnet 261, by plug connections 353. The relay 425 for the resetting magnet is connected to contact C57 by a plug connection 354. The motor is started by closing switch 362. The perforated pattern cards hereinafter designated CM1, CM2, which are to be duplicated, are stacked in hopper 34, Fig. 1, and blank cards hereinafter designated CV1, CV2 . . . are stacked in hopper 15. The operator depresses the start key "M," which closes the two contacts M1 and M2 and establishes the following circuit: Line 336, magnets 2 and 3, contacts M1, 337, 138a, 338, 420a, wire 339, contact M2, line 335. Relays 2 and 3 are energized and close contacts 2a, b, c, and 3a. Relay 4 is energized by a circuit through contacts 2b, C5, and relay 5 is energized by a circuit through contacts 442b, 2c. The two clutch magnets 68 and 87, Fig. 2 are energized by the circuits: Line 336, magnet 68, contact 2a, line 335 and line 336, magnet 87, contacts 442b, 2c, line 335. The two card feeding devices are operated at the same time and the pattern card CM1 and the blank card CV1 are advanced as shown in graph Fig. 12.

The operator releases the key and the machine stops when, at the end of the cycle, contacts C2 and C3 are opened, contacts 13f and 423f being open. The operator depresses the key again until the cards have been so advanced that card contacts CC206 and CC342 are closed by the cards, which causes energization of relays 13 and 423 and subsequent closure of contacts 13f and 423f. Contacts 8e, 10f, 417f and 421f are closed by the energization of their corresponding magnets, owing to the closure of card contacts CC204, 205 and 207 by the cards. Relay 6 is energized by the closure of contact CMM which is closed as long as there are cards in the pattern card hopper. Relay 415 is energized by the closure of contact CMP which is closed as long as there are cards in the blank card hopper, Fig. 15a.

The energization of clutch magnets 68 and 87 is maintained by contacts 4b, 337, 138a, 338, 420a, 7b, 8e, 10f, 13f, 415f, 417f, 421f, 423f and C6, and the machine runs automatically.

Figure 12:
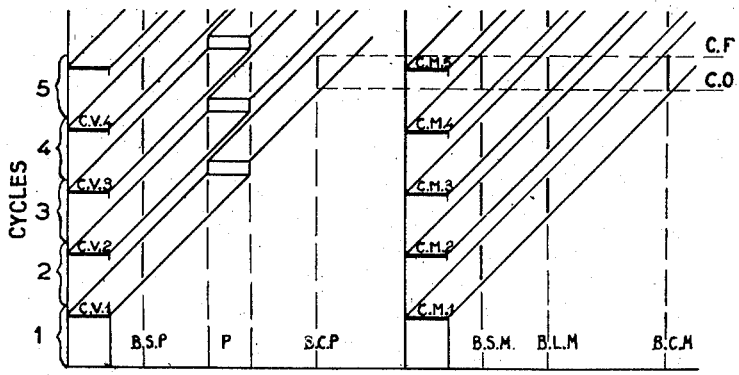
Figs. 12, 13 and 14 are graphs showing the movements of the cards in the machine.

During the second cycle, the first pattern card passes brushes BSM while the blank card passes brushes BSP, as shown in Fig. 12. No analysis takes place.

During the third cycle, the first pattern card passes brushes BLM. The brushes make contact through the perforations and magnets 261 are energized by the following circuit: Line 335, impulse contact 343, contact C56, contact 10e, brush 345, contact roller 61, perforation, analyzing brush, plug connection 350, magnet 261, line 336. The energization of a magnet 261 causes the corresponding punch to be locked as hereabove described.

The entry of invariable items contained in counter 361 (see Fig. 15) is effected at the same time as the analysis of the pattern card. Contacts C34 and C45 are closed in synchronism with the passing of the perforations of the card in front of the analyzing brushes. If a counter element contains a numeral, the reading out device of the totalizer element establishes contact, in a manner well known in totalizers of this kind, between the common strip 363 and a line 364 corresponding to said numeral. When a contact C36 to C45 corresponding to said line is closed, an impulse, timed to correspond to the numeral, is emitted through the following circuit: Line 335, impulse contact 343, contact C56, one of the contacts C36 to C45, line 364, common strip 363, plug connection 353, magnet 261, line 336. The first blank card is arrested at the end of the third cycle, just when it has reached its punching position beneath the punches, by the stopping of feed rollers 128, 129 due to the intermittent drive shown in Fig. 6 and hereabove described.

At the beginning of the fourth cycle, the die plate is moved upwards, and the first blank card is punched according to the items contained in the data receiving device, that is, according to the first pattern card and to the invariable items transferred from the counter.

When the punching operation is finished, the die plate is moved downwards into its initial position and the card moved forwards again. At this moment, contact C57 establishes the following circuit: Line 335, contacts 343, C57, plug connection 354, relay 425, line 336. Contacts 425a and b close and magnet 287 is energized by the circuit: Line 335, contact C21, contacts 425a, 425b, magnet 287, contact C55, line 336. When magnet 287 is energized, the data receiving device is reset to zero as hereabove described. The resetting to zero is effected just before the second pattern card is analyzed by brushes BLM. During the fourth cycle, the first pattern card and the first blank card now punched, are moved forwards, while data from the second pattern card are transferred to the data receiving device. At the end of the cycle, the second blank card is arrested beneath the punches.

During the fifth cycle, the first pattern card passes brushes BCM while the first blank card, now punched, passes brushes BCP. A control is then performed to ensure that the blank card has been perforated in absolute accordance with the pattern card.

If for column one, for example, the two cards have perforations of the same value, owing to the analysis of the two cards by the rows of brushes BCM and BCP respectively, the two coils of relay 457 connected to said column, receive impulses at the same time; contacts 457a and 457b close while contacts 457c and 457d open and no circuit is established for magnet 137.

It is the same for the other control relays which have been plugged. In the case when, for any column which has been plugged, the perforations of the two cards are not the same, the two coils of the relay connected to said column are energized at different moments. If, for example, only the left hand coil of relay 457 is energized, contact 457a closes, whereas contact 457b remains open. A circuit is established as follows: Line 335, contacts 457a, 457d, relay 137, wire 136, line 336. Relay 137 is held by a circuit through C59, 137a, 435b. Relay 138 is energized by the closure of contact 137b, and opens contact 138a in the circuit of clutch magnets 68, 87. These magnets are thus de-energized and the machine stops. In the graph Fig. 12, the beginning and the end of the analysis for the control of the first pattern card and the first blank card, are indicated by two horizontal lines CO and CF.

The machine continues to operate until all pattern cards have been duplicated, and the accuracy of the duplication has been determined.

(2) *Punching of cards in series.*—The machine is plugged as shown to the right hand side of Fig. 15b, comprising brushes BSP, BCP.

Figure 13:
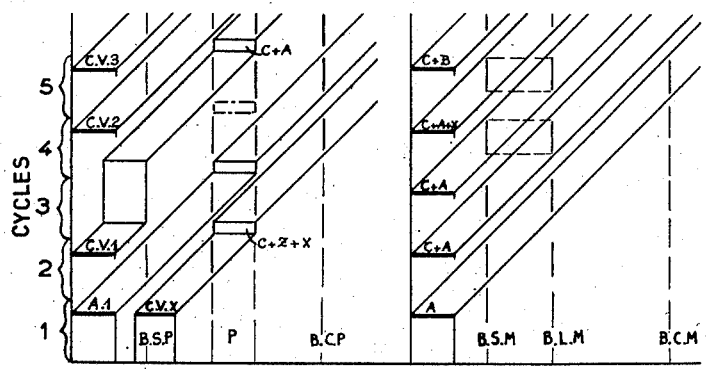

A number of master cards one of which is designated A1, Fig. 13, each followed by any desired number of blank cards CV1, CV2 . . . are stacked in the blank card hopper 15, Fig. 1, comprised in the card feeding device provided with a punching device P, and the machine is started as hereabove described. Switch 365 at the lower right hand corner of Fig. 15b is closed. During the second cycle, the master card A1 is analyzed by brushes BSP as shown in the left hand graph of Fig. 13. The master card is provided with a special perforation to distinguish it from other cards. It is assumed that this special perforation is a perforation "x" in the eleventh index point position of column eighty. The corresponding one of the brushes BSP is connected by a plug connection 355 in series with a contact C49 which is closed only when the perforation "x" passes the brushes. Through said contact the brush is connected to relay 442 by a plug connection 356, to relay 425 by a plug connection 357, and to relay 427 by a plug connection 358. These three relays are thus energized. The energization of relay 425 causes, as has been already described, the resetting to zero of the data receiving device after the punching of the last blank card of the preceding group, at the beginning of the third cycle. The energization of relay 442, which is maintained by a circuit through contacts 442a and C33, causes contact 442b to open in the circuit of clutch magnet 87, and thus, when C2 opens, relay 5 and magnet 87 are no longer energized. Through clutch 88, Fig. 2, the feed roller 17 is disconnected from the drive and stopped, and the blank card which follows the master card is arrested during the third cycle. By the opening of C33, relay 442 is no longer maintained, and contact 442b closes, so that the advance of the blank card may be resumed at the beginning of the fourth cycle.

The energization of relay 427 is maintained by a circuit through contacts 427a, C22 and causes contact 427b to close. Further, the energization of relay 427 causes the selecting contacts 443a, b, c, etc., to close during the fifth cycle as hereinafter explained.

During the third cycle, the master card is moved forwards beneath the punches, while the following blank card is arrested. The data receiving device is reset to zero as has been described. At the beginning of the third cycle, contact C23 establishes the circuit for relay 428, through contact 427b. Contact C22 opens, thereby causing relay 427 to be de-energized. Contact C59 establishes a holding circuit for relay 428, through contact 428a.

At the beginning of the fourth cycle, relay 429 is energized by a circuit through contacts C24, 428b, and held by a circuit through contacts 429a, C60, whereas relay 428 is no longer energized. At the beginning of the fourth cycle, the punching operation has no effect and the master card is not punched as the data receiving device is empty, and no latch lever 244 is in latching position. During the fourth cycle, the master card is moved to within a slight distance before brushes BCP while the blank card which follows at an interval of one cycle, passes the brushes BSP.

At the beginning of the fifth cycle, the closure of contact C52 establishes the circuit for relay 436 through contact 429c and plug connection 366. Relay 436 is held by a circuit through contact 436a. When contact C30 closes, a circuit is established through contact 436b, for relay 439 which is held by 439a and C29. Through plug connection 367, relays 443, 444, etc., are energized and held during the fifth cycle. All contacts 443a, b, c, etc. are thus closed in the fifth cycle during which the master card passes brushes BCP, and the following blank card is moved forwards beneath the punches.

Magnets 261 of the data receiving device are energized, for example by the circuit: Line 335, contacts 343, C56, 423e, brush 348, contact roller 59, perforation, brushes BCP, plug connection 373, contact 443c, plug connection 379, magnet 261, line 336. Invariable items from the counter are entered into the data receiving device, for example by the circuit: Line 335, contacts 343, C56, C36, line 364, common strip 363, plug connection 359, contact 443a, plug connection 360, magnet 261, line 336.

For the eightieth column of the data receiving device, the magnet 261 is connected to a brush BCP through plug connection 397, contact 456b, which is closed when the master card passes brushes BCP, plug connection 368, contact C46 and plug connection 370. Contact C46 opens when the perforation "$x$" passes the brushes. The perforation "$x$" in the column eighty will thus not be reproduced in the following blank cards, contrarily to other perforations in that column. At the beginning of the sixth cycle, the blank card which follows the master card at an interval of one cycle is punched in accordance with the master card, excepting said perforation "$x$," and in accordance with the invariable items of the counter. No resetting of the data receiving device is effected after the punching operation, assuming a second blank card to have passed brushes BSP during the fifth cycle, and assuming blank cards to have no perforation in the eightieth column.

During the seventh cycle, the second blank card is punched like the first. Blank cards are moved continuously forwards into punching position and are punched alike one after another, until a new master card passes brushes BSP. The perforation "$x$" in the eightieth column of the master card causes the resetting of the data receiving device during the next cycle, that is, after the last blank card has been punched. Further, the perforation "$x$" of the master card causes, if this is desirable, a perforation "$x$" to be punched in the first column of the last blank card by a circuit through plug connection 371. This perforation may serve to stop the blank card as hereinafter described in the mode of operation 4.

The new master card passes the punching device without being punched; the following blank card is stopped during one cycle, and the punching of blank cards controlled by the new master card and by the counter is effected, as hereabove described for the first master card.

(3) *Comparison of perforated cards in series.*— This operation may be carried out without interrupting the punching in series which has just been described. Cards to be compared are stacked in the pattern card hopper 34, Fig. 1. The plugging is shown to the left hand side of Fig. 15b, comprising brushes BSM, BLM, BCM.

When the first card A, Fig. 13, which is a master card passes brushes BSM, the control does not stop the machine, as the perforation "$x$" of the eightieth column establishes a circuit through plug connection 372, contact C48, closed when the perforation "$x$" passes the brushes, and plug connection 374, for relay 435 which opens contact 435b. Relay 435 is held for some time by a circuit through contacts 435a, C22.

The first card passes then brushes BLM at the same time as the second card "C+A" passes brushes BSM as shown in the graph to the right hand side of Fig. 13. Brushes BSM and BLM are connected for each column to a control relay 457, 458, through plug connections 375 to 378. These relays operate as hereabove described for the duplication of cards, so that, if two cards analyzed at the same time have similar perforations, magnet 137 shall not be energized and the machine will continue to operate. If the two cards are not the same, magnets 137 and 138 will be energized in the above described way; contact 138a opens and the machine stops.

When a new master card comes beneath brushes BSM, the control does not operate owing to the opening of contact 435b as hereabove described.

For the eightieth column, the control relay is connected to a brush BSM and BLM through contacts C47 and C58 which open when the perforation "$x$" is analyzed in order to prevent the energization of said control relays upon the analysis of a perforation "$x$" in said column.

Figure 14:
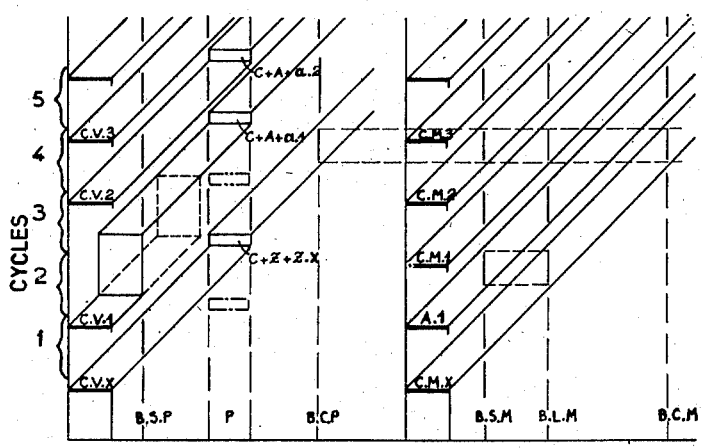

(4) *Punching of cards under simultaneous control of several cards.*—The plugging is shown in Fig. 15c. The master cards one of which is designated by the references A1 Fig. 14, followed each by any number of pattern cards CM1, CM2 . . . are stacked in the pattern card hopper 34, Fig. 1, comprised in the card feeding device which has no punching device, and blank cards CV1, CV2 . . . Fig. 14, are stacked in the blank card hopper 15, Fig. 1.

During the first cycle, a master card and a blank card are moved forwards without being yet analyzed by the first rows of brushes. The operator depresses key 382, Fig. 15c, which closes contact 383 and establishes a circuit which through plug connections 384, 385 energizes relay 442, whereby the blank card is stopped during the next cycle, as hereabove described for the second mode of operation. At the same time, relay 427 is energized by a circuit through plug connections 384, 388, and relay 431 is energized by a circuit through plug connections 384, 387. For the following groups, relays 442, 427 and 34k will be energized automatically, for example by a circuit established by a brush BSM, through a perforation "$x$" of the first column of the last pattern card CMX, Fig. 14, through plug connection 380 and contact C48.

Instead of controlling the stop of the blank card by a special perforation in the last pattern card of a group, said control could be performed by a group control device similar to the one described in point 3 above and shown in Fig. 15b. When the last card of a group passes brushes BLM at the same time as the first card of a new group, that is a master card, passes brushes BSM the change in the indications of the cards causes the energization at different moments of the two coils of those of the control relays of this second control device which have been connected and causes the energization of a magnet similar to magnet 137, which magnet is indicated by dotted lines and the reference 139 in Fig. 15c. This magnet 139 is maintained during one cycle like magnet 137. If now a connection has been made between plug socket 405 and plug socket 406, relay 442 will be energized and the blank card which is moved coincidently with the master card will be stopped during one cycle of the machine, for example during the third cycle, as indicated by dotted lines in Fig. 14 for the card CV1. The control between brushes BCM and BCP operates in an independent manner in relation to the control by said second control device between brushes BSM and BLM.

The energization of relay 427 causes contacts 427a and 427b to close. When contact C23 closes, at the beginning of the second cycle, relay 428 is energized by a circuit through contacts 427b, C23. The energization of relay 428 causes contacts 428a and c to close, and when, at the beginning of the third cycle, contact C52 closes, relay 436 is energized by a circuit through contact 428c, plug connection 390, contact C52. Relay 436 is held by a circuit through contact 436a. Also at the beginning of the third cycle, the closure of contact C30 establishes the circuit through contact 436b, for relay 439, and through plug connections 398, for relays 443, 444 and 456, which are held by a circuit through contacts C29, 439a. Relays 443, 444 close contacts 443a, 443b, 444a, etc., and relay 456 opens contacts 456a, 456b during the third cycle.

The energization of relay 431 causes contacts 431a and 431b to close. At the beginning of the second cycle, the closure of contact C26 establishes the circuit for relay 432 which is held by a circuit through contacts 432a, C61. At the beginning of the third cycle, the closure of contact C27 establishes the circuit for relay 433 through contact 432b. Relay 433 closes contacts 433a, b, and c, and is held by a circuit through contacts 433a, C62. At the beginning of the fourth cycle, the closure of contact C54 establishes the circuit, through contact 433c and plug connection 399, for relay 438 which is held by a circuit through contacts 438a, C64. At the beginning of the fifth cycle, the closure of contact C32 establishes the circuit, through contact 438b, for relay 441 and, through plug connection 369, for relay 435. Relay 435 is held by a circuit through contact 435a during the fifth cycle. Relay 435 neutralizes the control between brushes BCP and BCM, during the fifth cycle, owing to the opening of contact 435b.

During the second cycle, the first blank card is arrested while the master card passes brushes BSM. Relay 428 is energized as hereabove described.

During the third cycle, the first blank card passes brushes BSP. At the same time, the first pattern card passes brushes BSM, and the master card passes brushes BLM, as shown in graph Fig. 14. However, at the beginning of the third cycle, relay 426 and resetting magnet 288 are energized by a circuit through contact 428c, plug connection 386 and contact C67. At the same time, resetting magnet 287 is energized by a circuit through contact C57 and plug connection 389. The data receiving device is reset to zero altogether excepting data entered from the counter, just before the master card is analyzed by brushes BLM. Also at the beginning of the third cycle, relay 436 is energized, through plug connection 390, whereby, as hereabove described, relay 439 and selecting relays 443 to 456 are energized. Contacts 443a, b, close and contacts 456a, b, etc., open. During the third cycle, data from the master card are entered into the data receiving device by the circuit: Brushes BLM, plug connection 391, contact 443a, plug connection 392, magnet 261. Those of brushes BLM which are reserved for pattern cards cannot cause any transfer of items owing to the opening of contacts 456a, b.

During the fourth cycle, the first pattern card is analyzed by brushes BLM, and data are entered into the data receiving device by a circuit through contacts 456a, b, which are closed while contacts 443a, b, etc., are open, as the energization of relays 443 to 456 has ceased.

The first blank card is moved forwards beneath the punches. Relay 435 is energized by a circuit through plug connection 369 as hereabove described, and the control is neutralized for the next cycle.

At the beginning of the fifth cycle, the first blank card is punched in accordance with the master card and the first pattern card. The resetting to zero of the items entered into the data receiving device by the pattern card is effected for each cycle, owing to the energization of magnet 287. The master card passes brushes BCM while no blank card passes brushes BCP, but the control does not interfere, owing to the opening of contact 435b. The second pattern card passes brushes BLM and the transfer is effected in the above described way.

When the first pattern card and the first blank card, now punched, are passing brushes BCM and BCP respectively, the two cards are compared by control relays connected by plug connections 393 to 396.

The drawings include no graph for this special case, but it will be referred to the graph Fig. 13, in which the cards which are run in the pattern card feeding device are replaced by pattern cards. When the first master card passes brushes BSP, the first pattern card will pass simultaneously brushes BSM. The analysis of a special perforation in the master card by a brush BSP will cause the complete resetting to zero of the data receiving device by the energization of magnet 287 and the stopping of the following blank card during one cycle as previously explained for the second mode of operation. During the fifth cycle, the master card and the first pattern card will be simultaneously analyzed respectively by brushes BCP and BCM, which are connected to the data receiving device, in order to transfer the items from said cards to said data receiving device. During the sixth cycle, the first blank card will be punched according to the items perforated in the connected columns of both the master card and the pattern card. For each cycle, the data receiving device or accumulator is reset to zero, owing to the energization of magnet 288, only for the columns which are connected to the brushes BCM, which analyze the pattern card. Contacts 443a to 456a need not be included in the circuit, as the master cards and the pattern cards are analyzed by different brushes.

During each of the following cycles, each blank card is punched according to the master card and to a pattern card.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim:

1. In a machine for punching groups of record cards each from one pattern record card provided with perforations at a number of index points in a column, the index points of a card being distributed in a plurality of columns, the combination of a punching device including a plurality of punches corresponding respectively to different index point locations of a card column, individual means for setting each punch, two devices for analyzing the perforations of pattern record cars, means for successively feeding the pattern record cards, each followed by the group of blank cards to be duplicated therefrom across said machine first through the first analyzing device then through the punching device and finally through the second analyzing device, means, operative by the first analyzing device in response to the action of a special perforation provided in each pattern record card, for resetting to zero said punching device and temporarily stopping the feeding of the next blank card following said pattern card until said pattern card has left the punching device, selector means operative by the second analyzing device for operating those of said setting means which correspond to the analyzed perforations of the last pattern card fed to said second analyzing device, said selector means being capable of acting on the setting means of a plurality of punches in each row of punches, for each punching operation, and means for operating said punching device to perforate each blank record card as it passes through said punching device, by the punches thus set.

2. In a machine for punching groups of record cards each from one pattern record card provided with perforations at a number of index points, the index points of a card being distributed in a plurality of columns, the combination of a punching device including a plurality of punches corresponding respectively to different index point locations of a card column, individual means for setting each punch, two devices for analyzing the perforations of pattern record cards, means for successively feeding the pattern record cards each followed by the group of blank cards to be duplicated therefrom across said machine first through the first analyzing device then through the punching device and finally through the second analyzing device, means, operative by the first analyzing device in response to the action of a special perforation provided in each pattern record card for resetting to zero said punching device and temporarily stopping the feeding of the next blank card following said pattern card until said pattern card has left the punching device, selector means operative by the second analyzing device for operating those of said setting means which correspond to the analyzed perforations of the last pattern card fed to said second analyzing device, said selector means being capable of acting on the setting means of a plurality of punches in each row of punches, for each punching operation, means for operating said punching device to perforate each blank record card, as it passes through said punching device, by the punches thus set, and means operative by the first analyzing device in response to the action of a special perforation provided in each pattern card for making the second analyzing device operative only when a pattern card is passing therethrough.

3. In a machine for reproducing in blank cards the perforations of a master card and at least one pattern card, said perforations being distributed at a number of index-points locations in fields of columns, said fields being differently located for said master and pattern cards, the combination of a punching device including a plurality of rows of punches, each row containing a plurality of punches corresponding respectively to different index point locations of a card column, individual means for setting each punch, means for successively feeding blank record cards to said punching device, at least one device for analyzing the perforations of perforated record cards, means for feeding each master card and pattern card to said analyzing device successively, selector means each actuated by said analyzing device for setting separately into operative storage position those of said setting means which correspond to the analyzed perforations of a master card and at least one pattern card successively fed to said analyzing device, said selector means being capable of acting on the setting means of a plurality of punches in each row of punches, for each punching operation, and means for operating said punching device to perforate a blank record card by the punches thus set.

4. In a machine for reproducing on blank cards the perforations of a master card and at least one pattern card, said cards being provided with perforations at a number of index points, the index points of a card being distributed in a plurality of columns, the combination of a punching device including a plurality of rows of punches, each row containing a plurality of punches corresponding respectively to different index point locations of a card column, individual means for setting each punch, means for successively feeding blank record cards to said punching device, at least one device for analyzing the perforations of perforated record cards, means for feeding each master card and pattern card to said analyzing device successively, selector means comprising a plurality of selector elements, one element for each column of a card, said selector means being actuated by said analyzing device for operating by storage those of said setting means which correspond to the analyzed perforations of a master card and at least one pattern card successively analyzed by said analyzing device, each selector element being capable of acting on the setting means of a plurality of punches in each row of punches, for each punching operation, said analyzing means being responsive to the action of special and distinct perforations provided in the master cards so as to bring into operation some selector elements when a master card is passing through said analyzing device and other selector elements when a pattern card is passing through said analyzing device, and means for operating said punching device to perforate a blank record card by the punches thus set, so as to produce in a blank card perforations corresponding to the stored perforations of a master card and at least one pattern card respectively.

5. In a machine for reproducing on blank cards the perforations of a master card and at least one pattern card, said cards being provided with perforations at a number of index points, the index points of a card being distributed in a plurality of columns the combination of a punching device including a plurality of punches corresponding respectively to different index point locations of a card column, individual means for setting each punch, means for successively feeding blank record cards to said punching device, two devices for analyzing the perforations of perforated record cards, means for feeding each master card and pattern card to said analyzing devices successively, selector means actuated by the second analyzing device for operating by storage those of said setting means which correspond to the analyzed perforations of a master card and at least one pattern card successively fed to said second analyzing device, said selector means being capable of acting on the setting means of a plurality of punches in each row of punches, for each punching operation, means for operating said punching device to perforate a blank record card by the punches set, and means operative by the first analyzing means in response to a modification in the perforations of the cards passed through said first analyzing means for temporarily stopping the operation of the means for feeding the blank cards to the punching device.

6. In a machine for reproducing on blank cards the perforations of a master card and at least one pattern card, said cards being provided with perforations at a number of index points, the index points of a card being distributed in a plurality of columns, the combination of a punching device including a plurality of punches corresponding respectively to different index point locations of a card column, individual means for setting each punch, means for successively feeding blank record cards to said punching device, two devices for analyzing the perforations of perforated record cards, means for feeding each master card and pattern card to said analyzing devices successively, selector means including an electric circuit for each setting means and a magnet in each of said circuits operatively connected with the corresponding setting member, said selector means being actuated by the second analyzing device for operating by storage those of said setting means which correspond to the analyzed perforations of a master card and at least one pattern card successively fed to said second analyzing device, said selector means being capable of acting on the setting means of a plurality of punches in each row of punches, for each punching operation, means for operating said punching device to perforate a blank record card by the punches thus set, means for cutting off said circuits respectively, and means operative by the first analyzing means for bringing said cutting off means into play when a master card is analyzed by said second analyzing device and for bringing other cutting off means into play when a pattern card is analyzed by the second analyzing device.

KNUT ANDREAS KNUTSEN.

REFERENCES CITED

The following references are of record in the file of this patent:

UNITED STATES PATENTS

| Number | Name | Date |
| --- | --- | --- |
| 1,305,557 | Lasker | June 3, 1919 |
| 1,801,981 | Rogal | Apr. 21, 1931 |
| 1,863,097 | Borel | June 14, 1932 |
| 2,018,420 | Robinson | Oct. 22, 1935 |
| 2,032,805 | Lake | Mar. 3, 1936 |
| 2,045,977 | Bryce | June 30, 1936 |
| 2,046,082 | Mills | June 30, 1936 |
| 2,124,178 | Lasker | July 19, 1938 |
| 2,172,758 | Rice | Sept. 12, 1939 |
| 2,211,165 | Robinson et al. | Aug. 13, 1940 |
| 2,372,909 | Page | Apr. 3, 1945 |